United States Patent
Crawley

(10) Patent No.: US 7,634,028 B2
(45) Date of Patent: Dec. 15, 2009

(54) SELECTING CLOCK FREQUENCIES FOR BASEBAND DEVICES

(75) Inventor: Philip Crawley, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 930 days.

(21) Appl. No.: 10/854,935

(22) Filed: May 27, 2004

(65) Prior Publication Data

US 2005/0265486 A1 Dec. 1, 2005

(51) Int. Cl.
*H04L 27/00* (2006.01)
(52) U.S. Cl. .................................................. 375/326
(58) Field of Classification Search ................ 375/324, 375/326, 327, 339; 455/255–256, 259, 63.1, 455/296, 315
See application file for complete search history.

(56) References Cited

U.S. PATENT DOCUMENTS

| | | | | |
|---|---|---|---|---|
| 4,232,389 A | * | 11/1980 | Loiler | 455/3.02 |
| 5,745,848 A | * | 4/1998 | Robin | 455/296 |
| 5,995,552 A | * | 11/1999 | Moriyama | 375/271 |
| 6,437,693 B1 | * | 8/2002 | Todd | 340/541 |
| 6,567,654 B1 | * | 5/2003 | Coronel Arredondo et al. | 455/315 |
| 6,647,075 B1 | * | 11/2003 | Genrich | 375/316 |
| 6,738,608 B2 | * | 5/2004 | Black et al. | 455/260 |
| 6,999,723 B2 | * | 2/2006 | Kusbel et al. | 455/63.1 |
| 7,027,528 B2 | * | 4/2006 | Liu et al. | 375/326 |

OTHER PUBLICATIONS

"A Single-Chip Universal Digital Receiver with 480MHz IF Input" A. Kwentus, et al. 1999 IEEE International Solid-State Circuits Conference.

"Space-Time Code Design With Continuous Phase Modulation" Zhang, Xiaoxia and Michael P. Fitz. *IEEE Journal on Selected Areas in Communications*, vol. 21, No. 5, pp. 783-792. Jun. 2003.

"Noncoherent Continuous-Phase Modulation for DS-CDMA" Lutz H., L. Lampe, R. Schober, R.Tzschoppe, J. Huber. *In Proceedings of IEEE International Conference on Communications* (ICC '03), Anchorage, May 2003.

* cited by examiner

*Primary Examiner*—Khanh C Tran
(74) *Attorney, Agent, or Firm*—Trop, Pruner & Hu, P.C.

(57) ABSTRACT

Various embodiments of the present invention include methods and apparatus for receiving a radio frequency (RF) signal spectrum in a receiver; mixing the RF signal spectrum with a first local oscillator (LO) frequency to obtain a first downmixed signal; and converting the first downmixed signal to a first digital signal using an analog-to-digital converter (ADC) having an adjustable clock frequency selected to avoid interference with the first LO frequency. The adjustable clock frequency may be adjusted by a predetermined amount, by phase modulation, or in other manners.

25 Claims, 3 Drawing Sheets

SELECTING CLOCK FREQUENCIES FOR BASEBAND DEVICES

TECHNICAL FIELD OF THE INVENTION

The invention relates to integrated circuits, and more specifically to avoiding interference between different components within such circuits.

BACKGROUND

Numerous integrated circuits (IC) are used for mixed signal purposes. That is, such circuits include both analog and digital components. Specifically, certain such mixed signal circuits include analog circuitry that operates at extremely high frequencies, for example, radio frequencies (RF), and digital circuitry that operates at baseband frequencies. Because of the presence of both analog and digital circuitry within such IC devices, there is a potential for interference between the analog and digital components.

While various sources of such interference may exist, one particular source of interference may be interference caused by harmonics of baseband clock frequencies that interfere with RF frequencies within the IC device. Accordingly, a need exists to reduce or prevent such interference.

SUMMARY OF THE INVENTION

One aspect of the present invention includes a method of adjusting a clock frequency for a baseband component of a system to avoid interference with a RF signal, such as a signal channel or a local oscillator (LO) frequency used by a receiver of the system.

Another aspect of the present invention includes a method of receiving a RF signal spectrum in a receiver; mixing the RF signal spectrum with a first LO frequency to obtain a first downmixed signal; and converting the first downmixed signal to a first digital signal using an analog-to-digital converter (ADC) having an adjustable clock frequency selected to avoid interference with the first LO frequency.

In yet another aspect of the present invention, an apparatus is provided that includes a clock generator to generate a baseband clock frequency; and a controller coupled to the clock generator to adjust the baseband clock frequency to avoid interference with a RF frequency. Such an apparatus may be used in a system that includes a RF circuit to receive a satellite spectrum and to mix the satellite spectrum with a first LO frequency to obtain a first downconverted signal; and a first baseband circuit coupled to receive and to process the first downconverted signal, the first baseband circuit having at least one component to operate at the adjustable baseband clock frequency.

DETAILED DESCRIPTION

Figure 1:
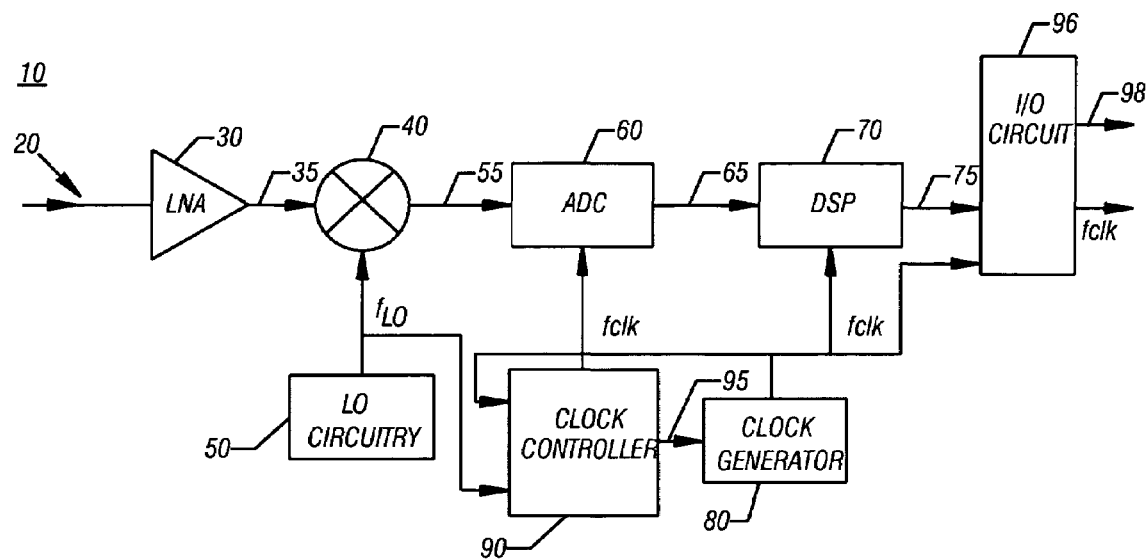
FIG. 1 is a block diagram of a receiver in accordance with one embodiment of the present invention.

Referring to FIG. 1, shown is a block diagram of a system in accordance with one embodiment of the present invention. As shown in FIG. 1, system 10 may be, for example, a receiver for use in a RF system such as a satellite receiver for use in a set-top box or other television tuner. While discussed primarily herein as used in such a satellite system, it is to be understood that other embodiments of the present invention may be used in connection with other RF systems, such as cellular telephones, radios, other communication systems and the like.

As shown in FIG. 1, system 10 receives an incoming signal 20 at a low noise amplifier (LNA) 30. The resulting amplified signal 35 may then be input into a mixer 40, where the RF signal is mixed with a local oscillator (LO) frequency ($f_{LO}$) provided by LO circuitry 50.

The resulting downconverted signal 55 may be provided to baseband circuitry for further processing. For example, downconverted signal 55 may be sent to an analog-to-digital converter (ADC) 60 for conversion from an analog signal to a corresponding digital signal 65. Digital signal 65 may then be provided to a digital signal processor (DSP) 70 for desired processing. In one embodiment, a wide-band ADC 60 may receive a coarsely tuned signal 55 and provide a digital output to DSP 70, which may be a tunable digital filter that in turn outputs digital baseband signals 75.

While such a DSP may take various forms, in certain embodiments, such a digital signal processor may include various circuitry for tuning, filtering, and processing digital signals. For example, such circuitry may include clock and data recovery circuitry, digital tuning circuitry, digital filtering circuitry, and digital decoding circuitry, for example.

The processed signals 75, which may be digital baseband signals, may be provided to additional circuitry (either on the same integrated circuit (IC) or to different circuitry) for further processing. For example, as shown in FIG. 1, the digital baseband signals 75 and the clock frequency may be provided to an input/output (I/O) circuit 96. Such an I/O circuit may be used to transfer both the digital data (output as data 98) and the clock frequency to other circuitry within a system. In various embodiments, different components may be included in such additional circuitry, including additional processing components, audio and video components and the like. In such manner, in certain embodiments, the clock frequency may be provided for use in other system components, in addition to the digital data.

Alternately, in other embodiments DSP 70 may sufficiently process incoming signals for their intended purpose. In the embodiment shown in FIG. 1, all components may be housed within a single integrated circuit, although the scope of the present invention is not so limited. Further, while not shown in FIG. 1, in other embodiments multiple tuners may be present within a single IC. Such multiple tuners may each include the same RF and baseband circuitry shown in FIG. 1.

As further shown in FIG. 1, a clock frequency ($f_{CLK}$) may be provided by a clock generator 80 and used as clock signals for baseband components, including ADC 60 and DSP 70 (or other such baseband circuits). While shown in FIG. 1 as providing the same clock signal to both ADC 60 and DSP 70, in other embodiments, different clock signals may be provided to these or other digital circuits.

There is a potential for interference between a harmonic of such a baseband or digital clock frequency and RF frequencies used in a system. For example, a digital clock frequency of 100 megahertz (MHz) may generate a harmonic (e.g., a tenth harmonic) that interferes with a RF frequency (e.g., a one gigahertz (GHz) frequency). Such an RF frequency may be within a band of a received signal (e.g., a received signal channel), a LO frequency, or any other RF frequency used in or received by the system. Thus it may be desirable to adjust the digital clock frequency to avoid interference at RF frequencies. Accordingly, a clock controller 90 may be used to control clock generator 80 so as to avoid this interference. While frequency planning is understood in the field of RF design, what is different in the embodiment is the fact that in certain broadband RF applications no single clock selection will suffice to eliminate the interference problem for all channels. Thus the clock frequency may be dynamically adjusted to adjust harmonics away from the "current" desired channel or "current" LO frequencies.

As shown in FIG. 1, clock controller 90 may receive the LO frequency output from LO circuitry 50 and the clock frequency output from clock generator 80. Of course, in other embodiments, other RF frequencies may be provided to clock controller 90 for comparison to a digital clock frequency. Based on analysis of these frequencies it may be determined whether there is a potential for interference therebetween. If such interference is likely, clock controller 90 may provide control signals 95 to clock generator 80 to adjust the clock frequency accordingly to avoid interference.

In one embodiment, clock controller 90 may include logic functionality to analyze an LO frequency used to downmix an incoming signal, and a baseband clock frequency to determine whether a potential exists for interference therebetween. For example, in one embodiment clock controller 90 may include a combination of hardware, software and/or firmware to analyze the incoming frequencies and determine whether any adjustment to the baseband clock frequency is desired.

In various embodiments, it may be determined whether a harmonic of the clock frequency (or frequencies) is near a desired signal channel. In such embodiments, "near" means that the two frequencies are close enough in frequency that undesired interference may occur if the clock frequency is not adjusted. While what is considered to be near a given signal may vary in different embodiments, in certain embodiments, if the harmonics are within between approximately 40 MHz and 80 MHz of a signal channel (or its LO frequency), the clock frequency may be adjusted.

In other embodiments, the clock frequency may be adjusted so that its harmonics are separated from a LO frequency by at least an amount equal to a crosstalk region. While the width of such a crosstalk region may vary, in certain embodiments such a crosstalk region may be between approximately 40-80 MHz wide, although the scope of the present invention is not so limited.

In certain embodiments, adjusting the clock frequency may be effected using software (or a combination of software, firmware and hardware) that may be executed within a system, such as a receiver, cellular telephone, or the like. For example, in the embodiment of FIG. 1, such software may be implemented within clock controller 90. Such embodiments may include an article in the form of a machine-accessible storage medium, which may include, but is not limited to, floppy diskettes, optical disks, CD-ROMs, and magneto-optical disks, ROMs, RAMs, EPROMs, EEPROMs, magnet or optical cards, flash memory, or other type of media/machine-accessible storage medium suitable for storing electronic instructions, onto which there are stored instructions and data that form a software program to perform such methods of avoiding interference.

Thus control signals 95 may be used to cause clock generator 80 to adjust its output, namely the clock frequency, $f_{CLK}$. While clock generator 80 may take different forms in various embodiments, in one embodiment, clock generator 80 may include a crystal oscillator, such as a quartz crystal that generates a reference frequency. Such a reference frequency may then be processed, for example, by dividing the reference frequency and then passing the divided output to clock frequency generation circuitry, such as a phase lock loop (PLL), a voltage controlled oscillator (VCO), or other such circuitry. While shown in the embodiment of FIG. 1 as generating a single clock frequency, it is to be understood that clock generator 80 may output multiple different baseband clock frequencies. Using feedback from control signals 95, clock generator 80 may accordingly adjust its output clock frequency (or frequencies) to avoid interference with RF frequencies, such as one or more signal channels of a satellite receiver.

In such manner, the clock frequency may be adjusted to move interfering tones away from, for example, a desired RF signal channel. Because digital clock frequencies exist at a much lower frequency than desired RF channel frequencies, by adjusting the digital clock frequency by a small amount, significant changes in harmonics of the clock frequency may be realized, thus avoiding interference at the desired RF signal frequency.

Figure 2:
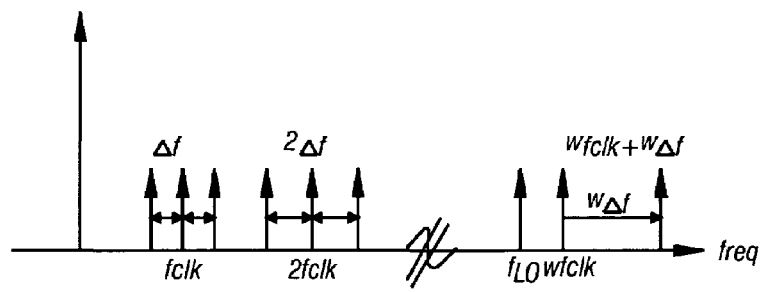
FIG. 2 is a graphical representation of a signal spectrum in accordance with one embodiment of the present invention.

Referring now to FIG. 2, shown is a graphical representation (not drawn to scale) of a signal spectrum in accordance with one embodiment of the present invention. As shown in FIG. 2, a digital clock frequency is present at $f_{CLK}$. For purposes of illustration, it may be assumed that $f_{CLK}$ is at 100 MHz. Further shown in FIG. 2 is a RF frequency ($f_{LO}$) corresponding to a LO frequency to be used for tuning a desired signal channel of an RF spectrum, for example, a television channel in a satellite television receiver. For sake of illustration, assume that the LO frequency is at two GHz. Thus, the twentieth harmonic of the clock frequency (i.e., $\omega f_{CLK}$) falls on the LO frequency (not shown precisely in FIG. 2 for ease of illustration) and therefore may cause interference.

Still referring to FIG. 2, if instead the clock frequency is adjusted by a small amount (i.e., a Δf), the harmonics of the adjusted clock frequency may be far enough away from the desired LO frequency such that no interference exists. For example, assume that Δf equals 2 MHz. Thus, at two times the clock frequency, a Δf of four MHz exists, and at the twentieth harmonic, a total change in frequency of 40 MHz exists (i.e., ωΔf). In such manner, interference may be avoided between the LO frequency and the harmonics of the clock frequency. The importance of this is that only small adjustments in the clock frequency may be used to avoid interference. In such manner, any costs associated with developing flexible digital logic (due the higher speed needed) and slightly larger tuning range needed for the PLL are reduced. Similarly, any cost to analog blocks that require the $f_{CLK}$, such as ADCs and digital-to-analog converters (DACs) is minimal. The designer only has to add a few percentage points of margin to such designs.

While the amount that a clock frequency may be shifted may vary in different embodiments, in certain embodiments a frequency shift of a small percentage may be sufficient to avoid interference at RF signal levels. Thus in various embodiments, a frequency shift between approximately 0.5% and 5% may be effected, and in particular embodiments, approximately a 2% frequency shift may be used.

In other embodiments, instead of a fixed percentage change to a clock frequency, a continuous phase modulation (CPM) of the clock frequency may be implemented. For example, a slow but large modulation of a clock frequency may be effected to avoid interference at RF signal levels.

Figure 3:
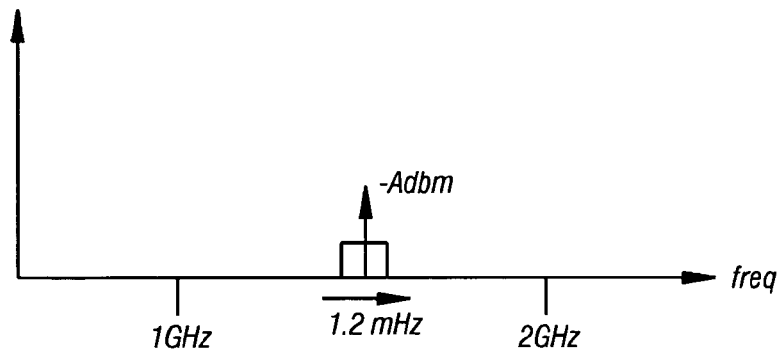
FIG. 3 is a graphical representation of a signal spectrum in accordance with another embodiment of the present invention.

Referring now to FIG. 3, shown is a signal spectrum in accordance with one embodiment of the present invention. As shown in FIG. 3, digital interference may create a tone in a desired signal channel at a frequency somewhere between 1 and 2 GHz. For example, shown in FIG. 3 is an undesired noise having a value of −A dbm in a given desired signal channel having a bandwidth of 1.2 MHz. By performing CPM of the digital clock frequency that causes this noise, the noise energy may instead be spread out over a wider frequency range, thus lowering the signal level of the noise to an acceptable level.

In certain embodiments, modulation of the clock frequency may be performed slowly. For example, for a clock frequency of 100 MHz, the modulation rate may be, for example, 100 kilohertz (KHz). However, the actual modulation of the clock frequency may be larger than a fixed adjustment to the clock frequency, as described above. For example, in certain embodiments a larger percentage of modulation may occur. As an example, for a digital clock frequency of 100 MHz, the clock frequency may be modulated by 5 or more MHz. In such manner, noise that may occur at a desired RF frequency may be spread out over a wider frequency range, such that the noise becomes insignificant.

Figure 4:
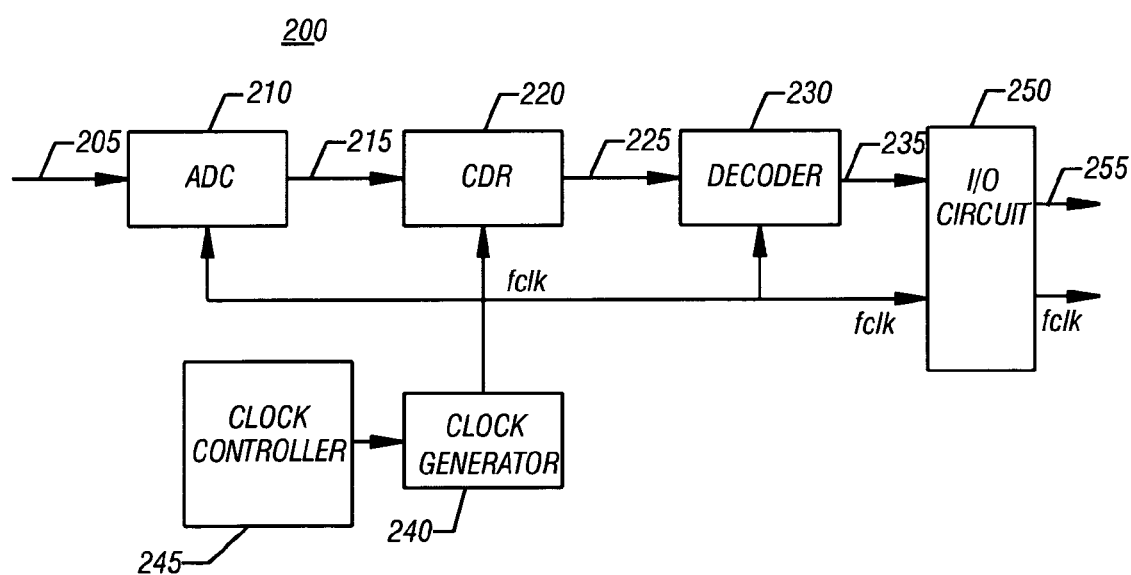
FIG. 4 is a block diagram of a portion of a system in accordance with one embodiment of the present invention.

Referring now to FIG. 4, shown is a block diagram of a system in accordance with another embodiment of the present invention. As shown in FIG. 4, system 200 may be a portion of a receiver, for example, a satellite receiver or the like. Only a portion of such a receiver is shown for purposes of the discussion of FIG. 4. However, it is to be understood that additional components may be present within such a receiver.

As shown in FIG. 4, an incoming downconverted analog signal 205 may be provided to an ADC 210 for digital conversion. The resulting digital signal 215 may be provided to a clock and data recovery unit (CDR) 220. CDR 220 may be used to recover a clock from the incoming signal as well as to sample the data present in the signal with the recovered clock. Thus the output of CDR 220 may be an encoded digital data stream 225 that is provided to a decoder 230. Decoder 230 may decode the encoded signals and provide a decoded digital output 235 to an input/output (I/O) circuit 250. For example, in one embodiment, decoder 230 may be a Viterbi decoder, although the scope of the present invention is not so limited.

As shown in FIG. 4, each of the digital circuits, including ADC 210, CDR 220, and decoder 230 are provided a digital clock frequency ($f_{CLK}$), generated from clock generator 240. While shown for ease of illustration in FIG. 4 as receiving the same clock frequency, it is to be understood that in other embodiments some or each digital circuit may receive its own clock frequency. Further shown in FIG. 4 is a clock controller 245 which may be used to provide control signals to clock generator 240 to modify, modulate, and/or adjust the clock frequency to avoid RF interference as described herein.

As further shown in FIG. 4, the decoded digital data 235 and the clock frequency may be provided to an I/O circuit 250. Such an I/O circuit may be used to transfer both the digital data and the clock frequency to other circuitry within a system. In such manner, in certain embodiments, the variable rate clock frequency may be provided for use in other system components, in addition to the decoded data.

However, it may instead be desired to provide a fixed rate of digital data out of system 200. To effect such a fixed data rate while using variable clock frequencies within system 200, a variable rate interpolator may be present within I/O circuit 250, for example, to digitally resample the data to the desired output frequency (e.g., an original clock frequency of one or more baseband components).

As discussed, adjustment to a baseband clock frequency may occur for various RF systems. For example, set-top box satellite receivers, including low intermediate-frequency (IF) architectures, and direct down conversion (DDC) architectures may utilize such clock frequency adjustments.

Similarly, clock frequency adjustment may be used in a receiver that analog coarsely tunes signal channels. In such an embodiment, by fine tuning a coarsely tuned channel spectrum, the receiver does not mix the desired channel down to a fixed target IF frequency and then mix the desired channel to DC. Rather, such an implementation uses analog coarse tune circuitry to mix the desired channel down to a variable location within a frequency range around DC, and then digital conversion and digital filtering is performed directly on the coarsely tuned channel spectrum.

Figure 5:
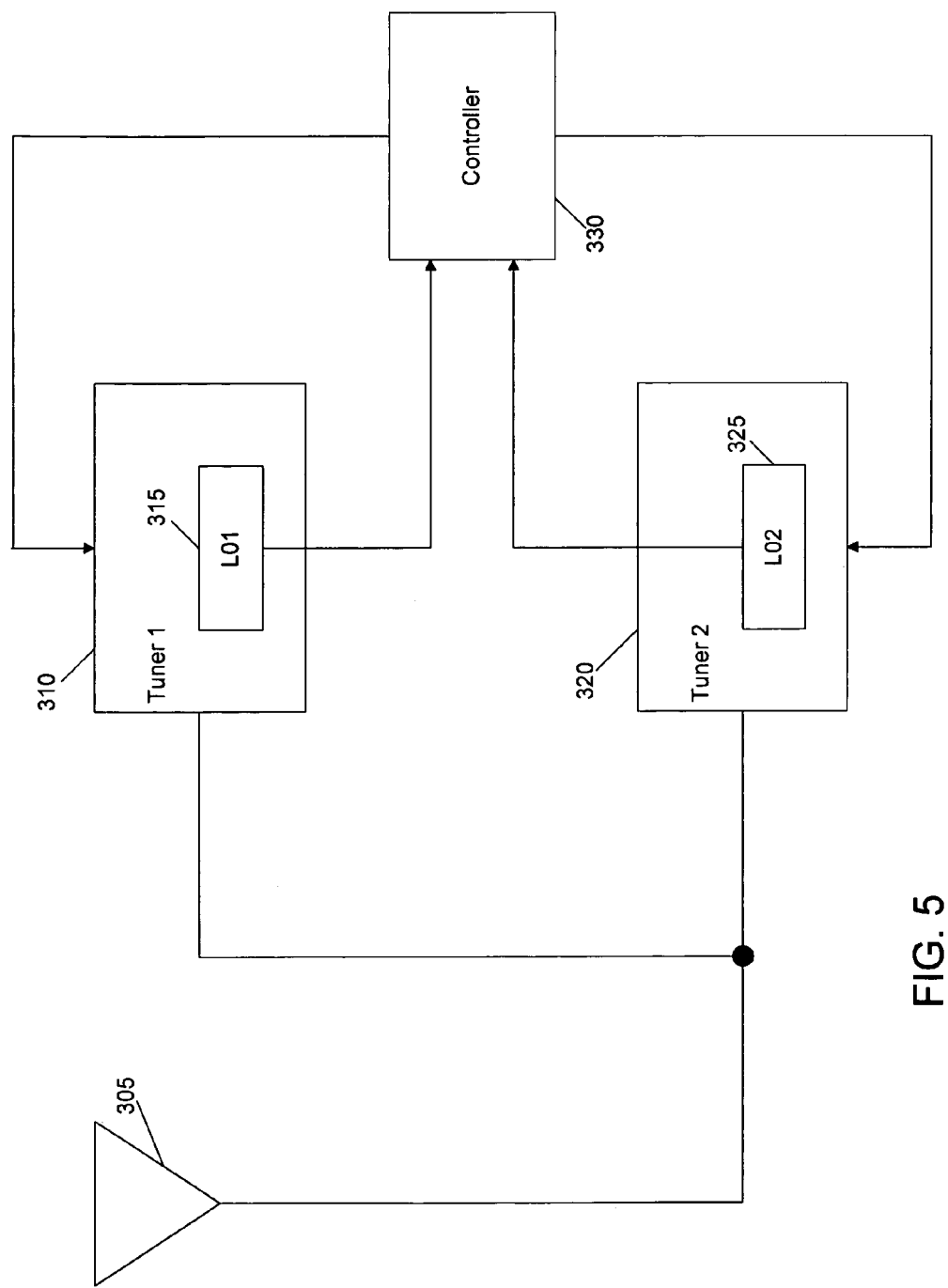
FIG. 5 is a flow diagram of multiple tuners in accordance with one embodiment of the present invention.

Further, such adjustments may be made in multi-tuner environments. In such environments, multiple tuners may be present to tune multiple signal channels as shown in FIG. 5. For example, two or more such tuners 310 and 320 may be present to tune multiple television channels received from a satellite source 305. Accordingly, multiple LO generation circuits 315 and 325 may be present. Furthermore, multiple signal channels may be received and tuned. Thus, one or more digital baseband clock frequencies may be adjusted to avoid interference with the signal channels and/or LO frequencies used in tuning such signal channels. In such embodiments, clock controller circuitry 330 may receive multiple RF frequencies, for example, multiple LO frequencies and use such frequencies to determine whether baseband clock frequency adjustment is needed, and if so, what adjusted clock frequency should be generated.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
  receiving in a controller a local oscillator (LO) frequency used for mixing with a radio frequency (RF) signal;
  determining in the controller if a harmonic of a first clock frequency of a clock signal for a baseband component of a system is substantially near the LO frequency;
  providing a first control signal from the controller to dynamically adjust the clock signal for the baseband component from the first clock frequency to a second clock frequency to avoid interference by the harmonic of the first clock frequency with the RF signal; and
  providing a second control signal from the controller to dynamically adjust a second clock signal for a second baseband component of the system to the second clock frequency to avoid interference by the harmonic of the first clock frequency with a second signal channel present in the RF signal, wherein the baseband component is to process a first signal channel present in the RF signal.

2. The method of claim 1, wherein the baseband component comprises an analog-to-digital converter (ADC).

3. The method of claim 2, wherein the clock signal is further provided to a digital filter.

4. The method of claim 2, further comprising transferring the processed first signal channel and the second clock frequency to a second circuit via an input/output (I/O) circuit.

5. The method of claim 2, further comprising interpolating the processed first signal channel to the first clock frequency, before output from an input/output (IO) circuit.

6. The method of claim 1, wherein the second clock frequency is within a predetermined range apart from the first clock frequency.

7. The method of claim 1, wherein adjusting the clock signal comprises phase modulating the first clock frequency to spread noise energy of the harmonic of the first clock frequency to reduce the noise energy in a signal channel.

8. A method comprising:
receiving a radio frequency (RF) signal spectrum in a receiver;
mixing the RF signal spectrum with a first local oscillator (LO) frequency to obtain a first downmixed signal;
converting the first downmixed signal to a first digital signal using an analog-to-digital converter (ADC) having an adjustable clock frequency that is dynamically adjustable if a harmonic of the adjustable clock frequency is within a predetermined distance from the first LO frequency;
mixing the RF signal spectrum with a second LO frequency to obtain a second downmixed signal; and
converting the second downmixed signal to a second digital signal using a second ADC having the adjustable clock frequency.

9. The method of claim 8, further comprising dynamically adjusting the adjustable clock frequency to be outside of a crosstalk region of a first signal channel.

10. The method of claim 9, further comprising comparing the adjustable clock frequency to the first signal channel in a controller and controlling a clock generator to dynamically adjust the adjustable clock frequency if the adjustable clock frequency is within the crosstalk region.

11. The method of claim 8, further comprising determining whether a first adjustable clock frequency interferes with the first LO frequency.

12. The method of claim 11, further comprising adjusting the first adjustable clock frequency to avoid the interference.

13. The method of claim 12, wherein adjusting the first adjustable clock frequency comprises changing the first adjustable clock frequency to a second adjustable clock frequency.

14. The method of claim 12, wherein adjusting the first adjustable clock frequency comprises phase modulating the first adjustable clock frequency.

15. The method of claim 8, further comprising outputting the adjustable clock frequency from the receiver.

16. The method of claim 15, further comprising outputting processed baseband signals from the receiver at the adjustable clock frequency.

17. The method of claim 8, further comprising interpolating the first digital signal to output the first digital signal at an output frequency different than the adjustable clock frequency.

18. An apparatus comprising:
a clock generator to generate a baseband clock frequency; and
a controller coupled to the clock generator to adjust the baseband clock frequency to avoid interference with a radio frequency (RF) frequency, wherein the controller includes instructions to adjust the baseband clock frequency if a harmonic of the baseband clock frequency is within a predetermined distance from a first local oscillator frequency of a first tuner of the apparatus to tune to a first signal channel or a second local oscillator frequency of a second tuner of the apparatus to tune a second signal channel;
a decoder to decode the first signal channel to obtain a decoded digital output; and
an input/output (IO) circuit coupled to the decoder to output the decoded digital output to a second system component, the IO circuit to further output the adjusted baseband clock frequency.

19. The apparatus of claim 18, further comprising a first local oscillator to generate the first local oscillator frequency.

20. The apparatus of claim 19, wherein the first local oscillator frequency and the baseband clock frequency are coupled as inputs to the controller.

21. The apparatus of claim 18, wherein the controller includes instructions to phase modulate the baseband clock frequency.

22. The apparatus of claim 18, wherein the IO circuit is to interpolate the decoded digital output to the baseband clock frequency before output from the IO circuit.

23. A receiver system comprising:
a first receiver comprising:
a first radio frequency (RF) circuit to receive a satellite spectrum and to mix the satellite spectrum with a first local oscillator (LO) frequency to obtain a first downconverted signal;
a first baseband circuit coupled to receive and to process the first downconverted signal, the first baseband circuit having at least one component to operate at an adjustable clock frequency;
a controller to adjust the adjustable clock frequency to avoid interference with a first signal channel of the satellite spectrum; and
an output circuit to output the adjustable clock frequency from the first receiver at an adjusted clock frequency;
a second receiver comprising:
a second radio frequency (RF) circuit to receive the satellite spectrum and to mix the satellite spectrum with a second local oscillator (LO) frequency to obtain a second downconverted signal; and
a second baseband circuit coupled to receive and to process the second downconverted signal, the second baseband circuit having at least one component to operate at the adjustable clock frequency.

24. The receiver system of claim 23, wherein the controller is coupled to adjust the adjustable clock frequency to avoid interference with the first LO frequency and the second LO frequency.

25. The receiver system of claim 23, wherein the output circuit is coupled to output processed signals at the adjustable clock frequency.

* * * * *